(12) United States Patent
Allen et al.

(10) Patent No.: US 6,867,789 B1
(45) Date of Patent: Mar. 15, 2005

(54) SYSTEM AND METHOD FOR GENERATING GRAPHICAL USER INTERFACES

(75) Inventors: Brian J. Allen, Machesney Park, IL (US); Bruce A. Buroker, Elgin, IL (US); John P. Flood, Bartlett, IL (US); Scott A. Gentz, Oregon, IL (US); Gina M. Lidman, Schaumburg, IL (US); William J. Teichman, Harleysville, PA (US)

(73) Assignee: Bank One, Delaware, National Association, Wilmington, DE (US)

( * ) Notice: Subject to any disclaimer, the term of this patent is extended or adjusted under 35 U.S.C. 154(b) by 0 days.

(21) Appl. No.: 09/597,298

(22) Filed: Jun. 20, 2000

(Under 37 CFR 1.47)

Related U.S. Application Data

(60) Provisional application No. 60/182,674, filed on Feb. 15, 2000.

(51) Int. Cl.⁷ ............................. G09G 5/00; G06F 17/66
(52) U.S. Cl. ........................................ 345/744; 705/35
(58) Field of Search ............................... 345/700, 745, 345/744, 760, 746; 705/1, 35, 38

(56) References Cited

U.S. PATENT DOCUMENTS

| | | |
|---|---|---|
| 3,316,395 A | 4/1967 | Lavin ........................ 235/185 |
| 3,896,266 A | 7/1975 | Waterbury .................... 179/1 |
| 3,938,091 A | 2/1976 | Atalla et al. ............ 340/149 A |
| 4,321,672 A | 3/1982 | Braun et al. ................ 364/408 |
| 4,396,985 A | 8/1983 | Ohara ........................ 364/405 |
| 4,567,359 A | 1/1986 | Lockwood ................... 235/381 |
| 4,594,663 A | 6/1986 | Nagata et al. .............. 364/401 |
| 4,633,397 A | 12/1986 | Macco |
| 4,672,377 A | 6/1987 | Murphy et al. ......... 340/825.34 |
| 4,695,880 A | 9/1987 | Johnson |
| 4,696,491 A | 9/1987 | Stenger |
| 4,700,055 A | 10/1987 | Kashkashian, Jr. .......... 235/379 |
| 4,713,761 A | 12/1987 | Sharpe |
| 4,725,719 A | 2/1988 | Oncken et al. ............. 235/487 |
| 4,736,294 A | 4/1988 | Gill et al. ................... 364/408 |
| 4,745,468 A | 5/1988 | Von Kohorn ................ 358/84 |
| 4,797,913 A | 1/1989 | Kaplan et al. ................ 379/91 |
| 4,799,156 A | 1/1989 | Shavit et al. ............... 364/401 |
| 4,812,628 A | 3/1989 | Boston et al. .............. 235/380 |
| 4,823,264 A | 4/1989 | Deming ...................... 364/408 |
| 4,831,526 A | 5/1989 | Luchs et al. ................ 364/401 |
| 4,866,634 A | 9/1989 | Reboh et al. ............... 364/513 |
| 4,882,675 A | 11/1989 | Nichtberger et al. ........ 364/401 |
| 4,914,587 A | 4/1990 | Clouse ....................... 364/408 |
| 4,926,255 A | 5/1990 | Von Kohorn ................ 358/84 |
| 4,964,043 A | 10/1990 | Galvin ....................... 364/401 |
| 4,988,849 A | 1/1991 | Sasaki et al. ............... 235/379 |
| 4,992,940 A | 2/1991 | Dworkin ..................... 364/401 |
| 5,016,270 A | 5/1991 | Katz |
| 5,023,904 A | 6/1991 | Kaplan et al. ................ 379/91 |
| 5,034,807 A | 7/1991 | Von Kohorn ................ 358/84 |

(List continued on next page.)

OTHER PUBLICATIONS eCharge, eCharge Corporation, www.echarge.com, Dec. 3, 1999.

Tracy Pletz et al., Summary of the at your risk architecture, Jun. 3, 1999.

(List continued on next page.)

*Primary Examiner*—Kristine Kincaid
*Assistant Examiner*—Thanh Vu
(74) *Attorney, Agent, or Firm*—Hunton & Williams LLP

(57) ABSTRACT

An automated method for generating Graphical User Interfaces (GUI's) is illustrated in the context of a system for processing financial applications. In one embodiment, the GUI generator converts domain data representing over one thousand application types into an equal number of corresponding user screens. The interface may also be bi-directional, operating on user inputs to validate data or check for double keying.

25 Claims, 4 Drawing Sheets

U.S. PATENT DOCUMENTS

| | | | |
|---|---|---|---|
| 5,050,207 A | 9/1991 | Hitchcock | 379/96 |
| 5,053,607 A | 10/1991 | Carlson et al. | 235/379 |
| 5,054,096 A | 10/1991 | Beizer | 382/41 |
| 5,057,915 A | 10/1991 | Von Kohorn | 358/84 |
| 5,084,816 A | 1/1992 | Boese et al. | 395/575 |
| 5,111,395 A | 5/1992 | Smith et al. | 364/408 |
| 5,157,717 A | 10/1992 | Hitchcock | 379/96 |
| 5,175,682 A | 12/1992 | Higashiyama et al. | 364/408 |
| 5,206,803 A | 4/1993 | Vitagliano et al. | 364/408 |
| 5,220,501 A | 6/1993 | Lawlor et al. | 364/408 |
| 5,225,978 A | 7/1993 | Petersen et al. | 364/408 |
| 5,233,654 A | 8/1993 | Harvey et al. | 380/20 |
| 5,237,620 A | 8/1993 | Deaton et al. | 382/7 |
| 5,239,462 A | 8/1993 | Jones et al. | 364/408 |
| 5,262,941 A | 11/1993 | Saladin et al. | 364/408 |
| 5,265,033 A | 11/1993 | Vajk et al. | 364/514 |
| 5,274,547 A | 12/1993 | Zoffel et al. | 364/408 |
| 5,283,829 A | 2/1994 | Anderson | 380/24 |
| 5,287,269 A | 2/1994 | Dorrough et al. | 364/408 |
| 5,311,594 A | 5/1994 | Penzias | 380/23 |
| 5,317,683 A | 5/1994 | Hager | |
| 5,321,841 A | 6/1994 | East et al. | 395/725 |
| 5,350,906 A | 9/1994 | Brody et al. | 235/379 |
| 5,351,186 A | 9/1994 | Bullock et al. | 364/401 |
| 5,367,581 A | 11/1994 | Abel et al. | 382/64 |
| 5,373,550 A | 12/1994 | Campbell et al. | 379/100 |
| 5,396,417 A | 3/1995 | Burks et al. | 364/401 |
| 5,402,474 A | 3/1995 | Miller et al. | 379/93 |
| 5,412,190 A | 5/1995 | Josephson et al. | 235/379 |
| 5,412,708 A | 5/1995 | Katz | |
| 5,420,405 A | 5/1995 | Chasek | 235/379 |
| 5,424,938 A | 6/1995 | Wagner et al. | 364/408 |
| 5,446,740 A | 8/1995 | Yien et al. | 370/110.1 |
| 5,450,134 A | 9/1995 | Legate | 348/467 |
| 5,450,537 A | 9/1995 | Hirai | |
| 5,465,206 A | 11/1995 | Hilt et al. | 364/406 |
| 5,467,269 A | 11/1995 | Flaten | |
| 5,473,143 A | 12/1995 | Vak et al. | 235/380 |
| 5,473,732 A | 12/1995 | Change | |
| 5,479,494 A | 12/1995 | Clitherow | 379/144 |
| 5,479,532 A | 12/1995 | Abel et al. | 382/137 |
| 5,483,445 A | 1/1996 | Pickering | 364/406 |
| 5,484,988 A | 1/1996 | Hills et al. | 235/379 |
| 5,485,370 A | 1/1996 | Moss et al. | 364/408 |
| 5,504,677 A | 4/1996 | Pollin | 364/408 |
| 5,506,580 A | 4/1996 | Whiting et al. | 341/51 |
| 5,511,117 A | 4/1996 | Zazzera | 379/265 |
| 5,513,250 A | 4/1996 | Mcallister | 379/91 |
| 5,532,920 A | 7/1996 | Hartrick et al. | 364/419.1 |
| 5,537,314 A | 7/1996 | Kanter | 364/406 |
| 5,537,315 A | 7/1996 | Mitcham | 364/408 |
| 5,537,473 A | 7/1996 | Saward | 380/16 |
| 5,544,040 A | 8/1996 | Gerbaulet | 364/401 |
| 5,544,086 A | 8/1996 | Davis et al. | 364/408 |
| 5,550,734 A | 8/1996 | Tarter et al. | 364/401 |
| 5,551,021 A | 8/1996 | Harada et al. | 395/600 |
| 5,557,334 A | 9/1996 | Legate | 348/473 |
| 5,557,518 A | 9/1996 | Rosen | 364/408 |
| 5,566,330 A | 10/1996 | Sheffield | 395/600 |
| 5,568,489 A | 10/1996 | Yien et al. | 370/110.1 |
| 5,570,465 A | 10/1996 | Tsakanikas | 395/114 |
| 5,583,759 A | 12/1996 | Geer | 395/245 |
| 5,590,197 A | 12/1996 | Chen et al. | 380/24 |
| 5,592,378 A | 1/1997 | Cameron et al. | 395/227 |
| 5,592,560 A | 1/1997 | Deaton | |
| 5,594,837 A | 1/1997 | Noyes | |
| 5,598,557 A | 1/1997 | Doner et al. | 395/605 |
| 5,606,496 A | 2/1997 | D'Agostino | 395/235 |
| 5,611,052 A | 3/1997 | Dykstra et al. | 395/238 |
| 5,621,201 A | 4/1997 | Langhans et al. | 235/380 |
| 5,621,789 A | 4/1997 | Mccalmont et al. | 379/265 |
| 5,621,812 A | 4/1997 | Deaton | |
| 5,625,767 A | 4/1997 | Bartell et al. | 395/140 |
| 5,634,101 A | 5/1997 | Blau | 395/210 |
| 5,638,457 A | 6/1997 | Deaton | |
| 5,644,493 A | 7/1997 | Motai et al. | 364/468.02 |
| 5,649,117 A | 7/1997 | Landry | 395/240 |
| 5,652,786 A | 7/1997 | Rogers | 379/91.01 |
| 5,653,914 A | 8/1997 | Holmes et al. | 252/301.16 |
| 5,655,085 A | 8/1997 | Ryan et al. | 364/401 |
| 5,657,383 A | 8/1997 | Gerber et al. | 379/266 |
| 5,659,165 A | 8/1997 | Jennings et al. | 235/379 |
| 5,664,115 A | 9/1997 | Fraser | 705/37 |
| 5,675,662 A | 10/1997 | Deaton | |
| 5,677,955 A | 10/1997 | Doggett et al. | 380/24 |
| 5,679,938 A | 10/1997 | Templeton et al. | 235/379 |
| 5,679,940 A | 10/1997 | Templeton et al. | 235/380 |
| 5,684,870 A | 11/1997 | Maloney et al. | 379/212 |
| 5,696,907 A | 12/1997 | Tom | 395/238 |
| 5,699,527 A | 12/1997 | Davidson | 395/238 |
| 5,699,528 A | 12/1997 | Hogan | 395/240 |
| 5,703,344 A | 12/1997 | Bezy et al. | 235/379 |
| 5,708,422 A | 1/1998 | Blonder et al. | 340/825.34 |
| 5,710,886 A | 1/1998 | Christensen et al. | 395/214 |
| 5,710,887 A | 1/1998 | Chelliah et al. | 395/226 |
| 5,710,889 A | 1/1998 | Clark et al. | 395/244 |
| 5,715,298 A | 2/1998 | Rogers | 379/91.01 |
| 5,715,314 A | 2/1998 | Payne et al. | 380/24 |
| 5,715,399 A | 2/1998 | Bezos | 395/227 |
| 5,724,424 A | 3/1998 | Gifford | 380/24 |
| 5,727,163 A | 3/1998 | Bezos | 395/227 |
| 5,727,249 A | 3/1998 | Pollin | 705/40 |
| 5,734,838 A | 3/1998 | Robinson | |
| 5,740,231 A | 4/1998 | Cohn | |
| 5,740,425 A | 4/1998 | Povilus | 707/100 |
| 5,742,775 A | 4/1998 | King | 395/238 |
| 5,748,780 A | 5/1998 | Stolfo | 382/232 |
| 5,754,840 A | 5/1998 | Rivette | |
| 5,758,328 A | 5/1998 | Giovannoli | 705/26 |
| 5,761,647 A | 6/1998 | Boushy | 705/10 |
| 5,761,661 A | 6/1998 | Coussens et al. | 707/9 |
| 5,765,141 A | 6/1998 | Spector | 705/14 |
| 5,765,144 A | 6/1998 | Larche et al. | 705/38 |
| 5,770,843 A | 6/1998 | Rose et al. | 235/380 |
| 5,774,122 A | 6/1998 | Kojima et al. | 345/355 |
| 5,774,882 A | 6/1998 | Keen et al. | 705/38 |
| 5,778,178 A | 7/1998 | Arunachalam | 395/200.33 |
| 5,784,562 A | 7/1998 | Diener | |
| 5,787,403 A | 7/1998 | Randle | 705/43 |
| 5,790,650 A | 8/1998 | Dunn et al. | 379/265 |
| 5,790,785 A | 8/1998 | Klug | |
| 5,793,861 A | 8/1998 | Haigh | 379/266 |
| 5,794,207 A | 8/1998 | Walker et al. | 705/23 |
| 5,794,221 A | 8/1998 | Egendorf | 705/40 |
| 5,794,259 A | 8/1998 | Kikinis | |
| 5,796,395 A | 8/1998 | De Hond | |
| 5,797,133 A | 8/1998 | Jones et al. | 705/38 |
| 5,802,498 A | 9/1998 | Comesanas | 705/34 |
| 5,802,502 A | 9/1998 | Gell et al. | 705/37 |
| 5,809,478 A | 9/1998 | Greco et al. | 705/4 |
| 5,815,657 A | 9/1998 | Williams | |
| 5,815,683 A | 9/1998 | Vogler | 395/500 |
| 5,819,092 A | 10/1998 | Ferguson et al. | 395/701 |
| 5,819,236 A | 10/1998 | Josephson | 705/35 |
| 5,819,285 A | 10/1998 | Damico et al. | 707/104 |
| 5,825,870 A | 10/1998 | Miloslavsky | 379/265 |
| 5,826,241 A | 10/1998 | Stein et al. | 705/26 |
| 5,826,245 A | 10/1998 | Sandberg-Diment | 705/44 |
| 5,826,250 A | 10/1998 | Trefler | 706/50 |
| 5,832,447 A | 11/1998 | Rieker et al. | 705/2 |
| 5,832,460 A | 11/1998 | Bednar et al. | 705/27 |

| | | |
|---|---|---|
| 5,832,463 A | 11/1998 | Funk .................................... 705/35 |
| 5,832,476 A | 11/1998 | Tada et al. ........................ 707/2 |
| 5,835,580 A | 11/1998 | Fraser ............................ 379/115 |
| 5,835,603 A | 11/1998 | Coutts ............................ 380/49 |
| 5,838,906 A | 11/1998 | Doyle et al. ............ 395/200.32 |
| 5,842,178 A | 11/1998 | Giovannoli .................... 705/26 |
| 5,842,211 A | 11/1998 | Horadan et al. .............. 707/10 |
| 5,844,553 A | 12/1998 | Hao et al. .................... 345/329 |
| 5,845,256 A | 12/1998 | Pescitelli et al. .............. 705/4 |
| 5,845,259 A | 12/1998 | West et al. .................... 705/14 |
| 5,845,260 A | 12/1998 | Nakano |
| 5,847,709 A | 12/1998 | Card et al. .................. 345/355 |
| 5,848,427 A | 12/1998 | Hyodo ........................ 707/513 |
| 5,852,812 A | 12/1998 | Reeder .......................... 705/39 |
| 5,859,419 A | 1/1999 | Wynn .......................... 235/487 |
| 5,862,223 A | 1/1999 | Walker et al. ................ 380/25 |
| 5,864,609 A | 1/1999 | Cross et al. ................ 379/115 |
| 5,864,830 A | 1/1999 | Armetta et al. .............. 705/41 |
| 5,870,456 A | 2/1999 | Rogers .................... 379/91.01 |
| 5,870,718 A | 2/1999 | Spector ........................ 705/26 |
| 5,870,721 A | 2/1999 | Norris .......................... 705/38 |
| 5,870,723 A | 2/1999 | Pare, Jr. et al. ................ 705/39 |
| 5,870,724 A | 2/1999 | Lawlor et al. ................. 705/42 |
| 5,873,072 A | 2/1999 | Kight et al. ................... 705/40 |
| 5,873,096 A | 2/1999 | Lim et al. .................... 707/201 |
| 5,878,403 A | 3/1999 | DeFrancesco et al. ........ 705/38 |
| 5,880,769 A | 3/1999 | Nemirofsky et al. ........... 348/12 |
| 5,883,810 A | 3/1999 | Franklin et al. ........ 364/479.02 |
| 5,884,032 A | 3/1999 | Bateman et al. ........ 395/200.34 |
| 5,884,288 A | 3/1999 | Chang et al. ................. 705/40 |
| 5,889,863 A | 3/1999 | Weber .......................... 380/25 |
| 5,892,900 A | 4/1999 | Ginter |
| 5,897,625 A | 4/1999 | Gustin et al. .................. 704/43 |
| 5,898,780 A | 4/1999 | Liu |
| 5,899,982 A | 5/1999 | Randle .......................... 705/35 |
| 5,903,881 A | 5/1999 | Schrader et al. .............. 705/42 |
| 5,913,202 A | 6/1999 | Motoyama .................... 705/35 |
| 5,914,472 A | 6/1999 | Foladare |
| 5,915,244 A | 6/1999 | Jack |
| 5,918,214 A | 6/1999 | Perkowski .................... 705/27 |
| 5,918,217 A | 6/1999 | Maggioncalda et al. ...... 705/36 |
| 5,918,239 A | 6/1999 | Allen |
| 5,920,847 A | 7/1999 | Kolling et al. ................. 705/40 |
| 5,926,800 A | 7/1999 | Baronowski et al. ......... 705/35 |
| 5,926,812 A | 7/1999 | Hilsenrath et al. .............. 707/5 |
| 5,930,764 A | 7/1999 | Melchione et al. ............ 705/10 |
| 5,930,776 A | 7/1999 | Dykstra et al. ................ 705/38 |
| 5,933,816 A | 8/1999 | Zeanah |
| 5,933,817 A | 8/1999 | Hucal |
| 5,933,823 A | 8/1999 | Cullen et al. .................... 707/6 |
| 5,933,827 A | 8/1999 | Cole |
| 5,940,811 A | 8/1999 | Norris .......................... 705/38 |
| 5,940,812 A * | 8/1999 | Tengel et al. .................. 705/38 |
| 5,943,656 A | 8/1999 | Crooks et al. ................. 705/30 |
| 5,950,173 A | 9/1999 | Perkowski .................... 705/26 |
| 5,952,641 A | 9/1999 | Korshun |
| 5,953,710 A | 9/1999 | Fleming |
| 5,958,007 A | 9/1999 | Lee |
| 5,960,411 A | 9/1999 | Hartman |
| 5,963,952 A | 10/1999 | Smith |
| 5,963,953 A | 10/1999 | Cram |
| 5,966,698 A | 10/1999 | Pollin .......................... 705/34 |
| 5,966,699 A | 10/1999 | Zandi .......................... 705/38 |
| 5,969,318 A | 10/1999 | Mackenthun |
| 5,970,482 A | 10/1999 | Pham |
| 5,970,483 A | 10/1999 | Evans ............................ 707/3 |
| 5,978,780 A | 11/1999 | Watson ........................ 705/40 |
| 5,982,370 A | 11/1999 | Kamper |
| 5,983,206 A | 11/1999 | Oppenheimer ............... 705/38 |
| 5,987,434 A | 11/1999 | Libman ........................ 705/36 |
| 5,987,436 A | 11/1999 | Halbrook ...................... 705/38 |
| 5,991,751 A | 11/1999 | Rivette |
| 5,991,780 A | 11/1999 | Rivette |
| 5,995,947 A | 11/1999 | Fraser et al. .................. 705/38 |
| 5,995,948 A | 11/1999 | Whitford |
| 5,999,907 A | 12/1999 | Donner |
| 6,003,762 A | 12/1999 | Hayashida et al. ......... 235/379 |
| 6,005,939 A | 12/1999 | Fortenberry |
| 6,012,088 A | 1/2000 | Li |
| 6,014,636 A | 1/2000 | Reeder |
| 6,014,638 A | 1/2000 | Burge |
| 6,014,645 A | 1/2000 | Cunningham ................ 705/38 |
| 6,018,714 A | 1/2000 | Risen |
| 6,026,429 A | 2/2000 | Jones |
| 6,029,149 A | 2/2000 | Dykstra et al. ............... 705/38 |
| 6,029,245 A | 2/2000 | Scanlan ...................... 713/200 |
| 6,032,147 A | 2/2000 | Williams |
| 6,049,835 A | 4/2000 | Gagnon |
| 6,055,637 A | 4/2000 | Hudson |
| 6,061,665 A | 5/2000 | Bahreman |
| 6,064,987 A | 5/2000 | Walker |
| 6,081,810 A | 6/2000 | Rosenzweig |
| 6,088,683 A | 7/2000 | Jalili |
| 6,088,700 A | 7/2000 | Larsen |
| 6,098,070 A | 8/2000 | Maxwell |
| 6,112,181 A | 8/2000 | Shear |
| 6,131,810 A | 10/2000 | Weiss |
| 6,134,549 A | 10/2000 | Regnier |
| 6,144,948 A | 11/2000 | Walker |
| 6,148,293 A | 11/2000 | King |
| 6,170,011 B1 | 1/2001 | Macleod Beck |
| 6,185,242 B1 | 2/2001 | Arthur |
| 6,189,029 B1 | 2/2001 | Fuerst |
| 6,195,644 B1 | 2/2001 | Bowie |
| 6,201,948 B1 | 3/2001 | Cook |
| 6,208,979 B1 | 3/2001 | Sinclair ........................ 705/38 |
| 6,385,594 B1 | 5/2002 | Lebda et al. .................. 705/38 |
| 6,405,181 B2 | 6/2002 | Lent et al. .................... 705/38 |
| 6,424,979 B1 | 7/2002 | Livingston et al. ......... 707/511 |
| 2001/0054003 A1 | 12/2001 | Chien |
| 2002/0010599 A1 | 1/2002 | Levison |

OTHER PUBLICATIONS

Siebel, Siebel: Ensuring Customer Success, www.siebel.com, Nov. 17, 1999.

OMG, Welcome to OMG's CORBA for Beginners Page!, www.omg.com, May 25, 1999.

Sun MicroSytesm, Inc., Schema for Representing CORBA Objects in an LDAP directory, May 21, 1999.

OMG, Library, www.omg.com, May 25, 1999.

OMG, What is CORBA?, , www.omg.com, May 25, 1999.

Overview of CORBA, , www.omg.com, May 25, 1999.

JAVA, JAVA™ Technology in the Real World, java.sun.com, May 21, 1999.

JAVA, JAVA™ Servlet API, java.sun.com, May 21, 1999.

JAVA, Staying in Touch with JNDL, java.sun.com, May 21, 1999.

JAVA, JAVA™ Remote Method Invocation (RMI) Interface, java.sun.com, May 21, 1999.

JAVA, Banking on JAVA™ Technology, java.sun.com, May 21, 1999.

JAVA, The JDBC™ Data Access API, java.sun.com, May 21, 1999.

Anne Thomas, Enterprise JAVABEANS™ Technology: Server Component Model or the Java™ platform, java.sun.com, May 21, 1999.

S. R. Hiremath, Numerical Credit Scoring Model, Operations Research Bulletin, WA13.16, Apr. 30, 1975.

Reuters, Getting Smart with Java: Sun Micro Says American Express to Use Java for Smart Card, www.abcnew.go.com/sciences/tech, Jun. 6, 2000.

David Bank, Cash, Check, Charge—What's Next?, Seattle Times Mar. 6, 1998.

Gerry Vandenengel, Cardson the Internet: Advertising on a $3 Bill, Industry Intelligence, Feb. 1, 1995.

Kim A. Strassel, Dutch Software Concern Experiments with Electronic 'Cash' in Cyberspace, Wall Street Journal, Apr. 17, 1995.

Jeffrey Kutler, Cash Card Creator Looking Beyond Mondex, Feb. 9, 1995.

David Post, E–Cash: Can't Live With It, Can't Live Without It, The American Lawyer, pp. 116–117, Mar. 1, 1996.

Russell Mitchell, Cyberspace: Crafting Software . . . , Business Week, pp. 78–86, Feb. 27, 1995.

Jeffrey Kutler, A Different Drummer on the Data Highway, American Banker, May 12, 1995.

Stephen Eppmt, A pLayer Goes After Big Bucks in Cyberspace, American Banker, May 5, 1995.

Robert Barnham, Network Brings Together Producers and Companies, Bests Review Feb. 1, 1994.

Vanessa Houlder, OFT Gives the Individual Top Priority: Report Calls for Deregulation of Business Lending, The Financial Times, Jun. 8, 1994.

Kennedy Maiz, Fannie Mae on the Web, Newsbyte, May 8, 1995.

Anne Knowles, Improved Internet Security Enabling On–Line Commerce, PC Week, Mar. 20, 1995.

Aversion Therpay: Banks Overcoming Fear of the Net to Develop Safe Internet–based Payment System w/Netscape Communicator, Network World, Dec. 12, 1994.

Don Clark, Microsoft, Visa to Jointly Develop PC Electronic–Shipping Software, Wall Street Journal, The, B9, Nov. 9, 1994.

Understanding Product Data Management, Hewlett–Packard Company, Apr. 26, 1999.

Getting Started: Specific GE TPN Post Service Use Guidelines, GE, Apr. 26, 1999.

Resource Center: Consolidated Edison Selects GE TPN Post, GE, Apr. 26, 1999.

ThomasNet, Thomas Publishing Company, Apr. 26, 1999.

SoluSource: For Engineers By Engineers, Thomas Publishing Company, Apr. 26, 1999.

Harris InfoSource, Apr. 26, 1999.

Welcome to MUSE, MUSE Technologies, Apr. 26, 1999.

Product Data Integration Technologies, Inc., PDIT, Apr. 26, 1999.

SBA:Pro–Net, SBA, Apr. 1, 1999.

FreeMarkets, FreeMarkets Online, Inc., Apr. 26, 1999.

Associates National Bank (DE) Credit Card Services, The Associates, www.theassocitheassociates.atescomcorn/consumer/credit_cards/rnain.html, Apr. 6, 1999.

At Your Request, Wingspanbankcom, Sep. 28, 1999.

Robyn Meredith, Internet bank moves closer to virtual reality, USA Today, May 5, 1995.

Marvin Sirbu and J.D. Tygar, NetBill: An Internet Commerce System Optimized for Network Delivered Sevices, http://wwwini.cmu.edu :80/netbill, pp. 1–12, Feb. 27, 1995.

The check is in the email., Information Today, vol. 12, No. 3, Mar. 1, 1995, ISSN: 8755–6286.

The Gale Group, G&D America's Multi–application Smart Card Selected for Combined Payroll and 'Virtual Banking' Program in Mexico, wysiwgy://0/http://www.dialogclassic.com/history, Business Wire, Apr. 24, 1998, p4241047.

Richard Mitchell, Netlink Goes After An Unbanked Niche, wysiwyg://0/http://www.dialogclassic.com/history, ISSN: 1093–1279, Sep. 1999.

"Car Loans in Minutes," by Anonymous, *Bank Management,* Apr. 1993, v 69, n 4, p A23.

"Collections Strategy Model Phase II, " Proposal by Mike Alexander et al. of Applied Decision Analysis, Inc., Aug. 7, 1996.

"Competing in Auto Lending," by Phil Britt, *America's Community Banker,* Nov. 1996, v 6, n 11, pp. 33–37.

"Credit Scoring Digs Deeper Into Data," by Marc Friedland, *Credit World,* May 1996, v 84, n 5, pp. 19–23.

"Expanding Risk Management Strategies: Key to Future Survival," by Ron Jameson, *Credit World,* v 84, n 5, pp. 16–18 (no date).

"Fannie Mae on the Web," by Maize Kennedy, *Newsbytes,* May 8, 1995.

"OFT Gives the Individual Top Priority: Report Calls for Deregulation of Business Lending," by Vanessa Houlder, *The Financial Times,* Jun. 8, 1994.

"Operations Research," Spring 1975 Bulletin from *The Operations Research Society of America,* Chicago, IL, Apr. 30–May 2, 1975.

"Scoring Borrower Risk," by Deidre Sullivan, *Mortgage Banking,* Nov. 1994, v 55, n2, pp. 94–98.

"There Must Be a Better Way," by Fred Portner, *Mortgage Banking,* Nov. 1992, v 53, n 2, pp. 12–22.

"Using Software To Soften Big–Time Competition," by Michael Hickman *Bank Systems Technology,* Jun. 1994, v 31, n 8, pp. 38–40.

eCharge; Friday, 12.3.99; ©1999 eCHARGE Corporation; All rights reserved.

"A version therapy: Banks overcoming fear of the Net To develop safe Internet–based payment system w. Netscape Commun.," Network Word, Dec. 12, 1994, pg. 1.

"Cards on the Internet—Advertising on a $3 Bill," Industry Intelligence, by Gerry Vandenengel, pp. 46–48 (No Date).

"Cash Card Creator Looking Beyond Mondex," Feb. 9, 1995, by Jeffrey Kutler, 1 page.

"Cash, check, charge—what's next?, " published on Mar. 6, 1995 in the Seattle Times, by David Bank, 4 pages.

"The check is in the E–mail (online payment system for the Internet from Information Sciences Institute of the University of Southern California)," Information Today, vol. 12, No. 3, Mar. 1, 1995, pp. 1–4.

"But conflicting schemes leave marketers on sidelines for now," Advertising Age, Dec. 19, 1994, by Curtis Lang, pp. 1–5.

"Cyberspace—Crafting software that will let you build a business out there," Business Week, Feb. 27, 1995.

"E–Cash: Cant' Live With It, Can't Live Without It," The American Lawyer, Mar. 1995, by David Post, pp. 116–117.

"eCharge" website @ http:..www.echarge.com, eCharge Corporation, including sections 1—Corporate; 2—Products; 3—News; 4—Partners; and 5—Careers, Feb. 18, 2000.

Freemarkets® Web Applications Informational Brochure, including the following sections: 1–Buyers Saving Money; 2–Suppliers Growing Sales; 3–About FreeMarkets; 4–Career Opportunities; 5–Contacts; 6–What's New; and 7–Index, 1999, 34 pages.

"Getting Smart With Java—Sun Micro Says American Express to Use Java for Smart Card," ABCNEWS.com website, Reuters, San Francisco, Jun. 6, 2000, 2 pages.

"Getting Started—Specific GE TPN Post Service Use Guidelines" GE TPN Post Service Use Guidelines Website, Apr. 26, 1999, 18 pages.

"Resource Center—Consolidated Edison Selects GE TPB Post," GE TPN Post Resource Center website, Apr. 26, 1999, 9 pages.

"How the RMA.Fair, Issac credit–scoring model was built," Journal of Commercial Lending, vol. 77, No. 10, Jun. 1995, by Latimer Asch, 5 pages.

"Improved Internet security enabling on–line commerce (new services based on Secure Hypertext Transfer Protocol, Secure Sockets Layer standards)," PC Week vol. 12, No. 11, Mar. 20, 1995, by Anne Knowles, 4 pages.

"Microsoft, Visa to Jointly Develop PC Electronic–Shopping Software," The Wall Street Journal, Nov. 9, 1994, Technology section by Don Clark, 3 pages.

"Network brings together producers and companies," Alberta Cividanes, Feb. 1, 1994, by Robert Barnham, 1 page.

"NetBill: An Internet Commerce System Optimized for Network Delivered Services," Carnegie Mellon University, by Marvin Sirbu et al., Feb. 27, 1995, 11 pages.

"A Player Goes After Big Bucks in Cyberspace," American Banker, May 5, 1995, by Stephen Eppmt, 1 page.

"Product Data Integration Technologies, Inc.," website including section—The Company; 2—Services; 3—Products; 4—Communications Center; 5—Career Center; 6—New on the Site; and 7—Search our Site, Apr. 26, 1999 19 pages.

"SBA.Pro–Net," U.S. Small Business Adminstration Procurement Marketing and Access Network website, earliest date of Sep. 27, 1997, 11 pages.

"Siebel," website @ www.siebel.com including sections 1—Home; 2—About Siebel; 3—Products and Solutions; 4—Worldwide Services; 5—News & Events; 6—Siebel Customers; 7—Education; 8—Careers; 9—Alliances; and 10—Siebel Worldwide, Nov. 17, 1999, 29 pages.

"ThomasNet," website @ www.thomasnet.com, including sections 1—Electronic Services; 2—SoluSource; and 3—Technical Services, Apr. 26, 1999, 9 pages.

"Visa & Carnegie Mellon Plan Online Payment Scheme," Newsbytes News Network, Feb. 15, 1995, 2 pages.

"MUSE Technologies," website, including sections 1—Muse; 2—Muse Applied; 3—Products; 4—In the News; 5—Employment; 6—Insight; and 7—Request Additional Information, Apr. 26, 1999, 28 pages.

"Two Way String–Matching"; M. Crochemore, et al.; L.I.T.P., Institut Blaise Pascal, Université Paris 7, 2, Place Jussieu, Paris Cedex 05, France; Journal of the Association for Computing Machinery; vol. 38, No. 3; Jul. 1991; pps. 651–675.

"Cryptographic Algorithms" website; www.mach5.com.crypto.algorithms.html; printed 4.7.00; pps. 1–8.

"Concepts of Cryptography"; website; www.mach5.com.cryto.concepts.html; printed 4.17.00; pps. 1–2.

"Cryptography FAQs"; website: www.thawte.com.support.crypto.hash.html; printed 4.17.00; pps. 1–2.

"IP Authentication using Keyed SHA1 with Data Padding"; Internet Draft; P. Metzger, et al; Apr. 1996; pps. 1–6.

"Introduction to Public–Key Cryptography"; website: www.developer.netscape.com.docs. manuals.security.pkin.contents.htm.; pps. 1–19 Accessed Date Feb. 29, 2000.

"Introduction to SSL"; website: www.developer.netscape.comdocs.manuals.security.sslin.contents.htm; printed 2.29.00; pps. 1–11.

"8.1 URLs for HTTP Servers"; website: www.utoronto.co.webdocs.HTMLdocs.NewHTML.url_http.html; printed 7.26.00; pps. 1–2.

"Uniform Resource Locators"; www.w org..Addressing.URL.url–spec.html; printed 2.29.00; pps. 1–15.

"Understanding Malicious Content Mitigation for Web Developers"; website: www.cert.org.tech_tips,malicious_code_mitigation. html; printed 2.29.00; pps. 1–10.

FedCIRC Advisory FA–2000–02 Malicious "HTML Tags Embedded in Client Web Requests"; www2fedcirc.gov.advisori3es.FA–2000–02.html.

"Frequently Asked Questions About Malicious Web Scripts Redirected by Web Sites"; CERT® Coordination Center; website: www.cert.org.tech_tips.malicious_code_FAQ.html; pps. 1–5 Accessed Date Feb. 28, 2000.

"Information on Cross–Site Scripting Security Vulnerability"; website: www.microsoft.comtechnet.security.crssite.asp; printed 2.29.00; pps. 1–2.

"Cross–Site Scripting Security Exposure Executive Summary"; website: www.microsoft.com.technet.security.ExSumCS.asp; printed 2.29.00; pps. 1–4.

"Cross–Site Scripting: Frequently Asked Questions"; website: www.microsoft.com.technet.security.crsstFAQ.asp; printed 2.29.00; pps. 1–5.

"HOWTO: Prevent Cross–Site Scripting Security Issues"; website: www.support.microsoft.com.support.kb.articles.q252.9.85.

asp? FR=1; printed 2.29.00; pps. 1–4.

"Cross–site scripting Overview"; www.microsoft.com.technet.security.CSOvery.asp; printed 2.29.00; pps. 1–16.

"Hackers tampering with Internet, e–mail links"; D. Frank; www.fcw.com.few.articles.2000.0131.web–hackers 02–04–00.asp; written 2.4.00; printed 2.28.00; pps. 1–2.

* cited by examiner

SYSTEM AND METHOD FOR GENERATING GRAPHICAL USER INTERFACES

CROSS-REFERENCE TO RELATED APPLICATIONS

The subject matter of this application is related to the subject matter of U.S. patent application Ser. No. 09/599,602 entitled "SYSTEM AND METHOD FOR PROCESSING APPLICATIONS FOR FINANCIAL SERVICES" filed of even date herewith, which application is assigned or under obligation of assignment to the same assignee as this application and which is incorporated by reference herein. The subject matter of this application is also related to the subject matter of provisional U.S. Patent Application Serial No. 60/182,674 filed Feb. 15, 2000 entitled "SYSTEM AND METHOD FOR PROCESSING AND TRACKING APPLICATIONS FOR FINANCIAL PRODUCTS AND SERVICES," which application is assigned or under obligation of assignment to the same assignee as this application and which is incorporated by reference herein, and priority being claimed therefrom.

FIELD OF THE INVENTION

The invention described herein is for the automated generation of graphical user interfaces (GUI's).

BACKGROUND OF THE INVENTION

Present-day consumers have come to rely on the convenience of credit cards and other financial services. There is a high volume of new account applications for such services, even in the credit card industry, for example, where there is already a large base of existing credit card holders. Several factors may account for the high volume of credit card applications: consumers who have recently reached the age of majority are applying for their first credit card; existing credit card users often change from one credit service provider to another in order to obtain more favorable terms; and some credit card holders desire additional or upgraded credit cards.

The financial services industry is competitive. Banks and other financial service providers therefore may review a large number of applications in a limited amount of time, and they must make good decisions regarding the credit-worthiness of potential borrowers. Automated systems have been developed to process applications quickly and to track individual credit applications through the review process. Many application processing systems manage risk by employing a decision engine to consistently apply best business practices associated with the selection of customers.

Known systems and methods for processing high volumes of credit applications receive data from a single input channel, operate either in batch mode or in real-time mode, make credit decisions using a single decision engine, and customize user interfaces for different application types. Drawbacks of such implementations are considered below.

Credit applications typically include information such as name and address of the applicant(s), and may include information such as employment history, monthly income, monthly financial obligations, and the amount of credit being applied for. Potential customers submit credit applications to banks or other financial institutions through various channels. A drawback of existing application processing systems is that they are typically configured to accept applications from a single channel, for example paper applications received in the mail, applications submitted via the Internet, or applications received over the phone. Moreover, application processing systems may operate in a mode that is tailored to the type of input channel. For example, systems that process paper applications typically process in batch mode, whereas an interactive Internet application requires real time processing. It is inefficient for financial institutions to implement and maintain separate systems for processing applications that are submitted through different channels. On the other hand, it is a convenience to applicants, and thus a benefit to financial service providers, to offer a variety of application input alternatives.

Credit decisions are often made on the basis of information from the credit application itself, and from historical credit information provided by one or more independent credit bureaus. Decision engines typically include software implementations of algorithms designed to quantify risk based on such information, resulting in a determination as to whether credit should be offered to a particular applicant, and, if so, under what terms. Such algorithms are constantly evolving. As a consequence, application processing systems tailored to a particular decision engine may quickly become obsolete.

Additionally, many data processing systems, including those that process applications for financial services, are required to accommodate a variety of different user interface screens. A financial service provider may, for example, have hundreds of different new account application formats related to the variety of services it offers to consumers. System developers respond to this need by coding or scripting a variety of user interfaces that are tailored to the requirements of each application. Unfortunately, user interface requirements may be dynamic for many data processing operations. A financial services provider, for example, may wish to offer new services, may require new information to process existing products, or may simply change the layout of a user interface to make it more user-friendly. The result can be a high level of maintenance in the form of software support, which may be both costly and time-consuming.

Thus, existing application processing systems may have narrow operational value, and may require frequent modification. These and other drawbacks limit the efficiency of such systems.

SUMMARY OF THE INVENTION

The invention overcoming these and other drawbacks in the art relates a system and method that may accept applications for financial services from a variety of input channels, may operate in various processing modes, may utilize one or more decision engines during operation, and may generate user interface script automatically.

It is an object of the invention to make the process of applying for financial services more convenient for consumers. The techniques described herein for enabling a variety of input channels and for processing applications in a variety of modes may provide more data input options for applicants and may be a more efficient use of computing resources for financial institutions.

It is another object of the invention to provide financial institutions with a more powerful technique for automating credit decisions. A flexible interface to decision engines may be advantageous for several reasons. First, this type of interface may make multiple types of decision engines available simultaneously. This would be a benefit, for example, where different engines are used together to make decisions on different financial products, or where two or more decision engines are used to make a single determination. Moreover, a flexible interface may significantly reduce the cost of replacing decision engines in the overall system, when and if it becomes necessary.

It is another object of the invention to eliminate or reduce the amount of manual scripting required to support new user interfaces to data processing systems. By automatically generating user interface script based on functional parameters, it is no longer necessary to manually develop screen interfaces for the variety of applications that may be supported by any one system. This technique may be executed in situ (i.e., in the process of each user transaction), or it may be executed only once after a new application has been defined (in which case the resulting user interface script would be stored for later use).

In one embodiment of the invention, an applicant may communicate with the data processing system via the Internet. The applicant may further select a particular financial service from a menu of choices. In response, the script generator creates an appropriate user interface, which is presented to the user for completing and submitting an application for the selected financial service. The system processes the application data in a mode that is tailored to the input channel; here, it is likely that the system will operate in real time mode. The system may then select and employ one or more decision engines, as appropriate for the type of application that is to be processed. Once a determination has been made whether to perform financial services for the applicant, the data processing system notifies the applicant that their application has been either accepted or rejected.

The following drawings and descriptions further describe the invention, including several different embodiments of the major system components and processes. The construction of such a system, implementation of such a process, and advantages will be clear to a person skilled in the art of data processing generally, including financial services.

DETAILED DESCRIPTION OF THE INVENTION

Figure 1:
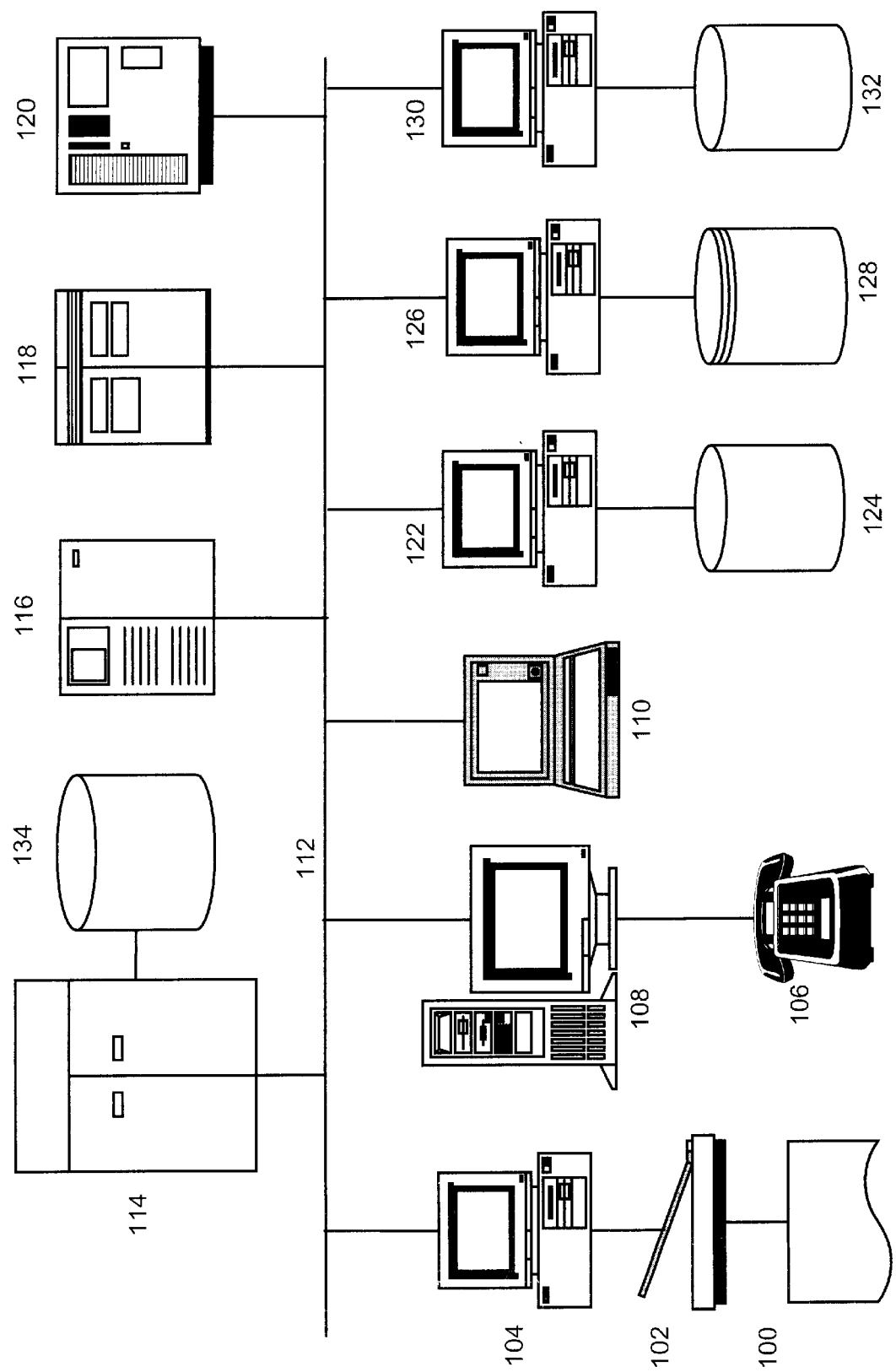
FIG. 1 is the schematic diagram of a system that processes applications for financial services, according to one embodiment of the invention.

FIG. 1 illustrates a system architecture for processing applications related to financial services according to the invention. A purpose of the system is to connect sources of electronic application data to decision engines and credit bureaus, and to host programs that coordinate the processing of application data. The schematic depicts among other possible resources: servers 114, 116, 118, 120, 122, 126 and 130; clients 104, 108, and 110; and databases 124, 128, 132 and 134. Servers and clients are connected via communication link 112, according to one embodiment of the invention.

Server 114 may perform or coordinate the processing of financial applications including functions such as data collection, validation, tracking, reconciliation, repair, routing, fulfillment, and reporting functions. Servers 116, 118, and 120 represent a variety of decision engines that such a system may include or interface to. Servers 122, 126 and 130 illustrate various credit bureau servers that the system may utilize to obtain credit history for a given applicant. Servers 114, 116, 118, 120, 122, 126 and 130 may be or include, for instance, a workstation running the Microsoft Windows™ NT™, Windows™ 2000, Unix, Linux, Xenix, IBM AIX, Hewlett-Packard UX, Novell Netware™, Sun Microsystems Solaris™, OS/2™, BeOS™, Mach, Apache, OpenStep™ or other operating system or platform.

Clients 104, 108, and 110 represent various sources for applications related to financial services. All provide applications to the processing system in electronic format. Client 104 depicts a source of electronic applications where paper documents 100 have been converted into electronic format by a scanner 102. Client 108 depicts a source for electronic applications originating via telephonic input 106. Client 110 depicts a direct user interface. Clients 104, 108, and 110 may be or include, for instance, a personal computer running the Microsoft Windows™ 95, 98, Millenium™, NT™, or 2000, Windows™ TMC™, PalmOS™, Unix, Linux, Solaris™, OS/2™, BeOS™, MacOS™ or other operating system or platform. Clients 104, 108, and 110 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Clients 104, 108, and 110 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Clients 104, 108, and 110 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

Databases 124, 128 and 132 may include credit history data for applicants and non-applicants, as maintained by various credit bureaus. Database 134 may include application data, application status information, and programs used by the application processing system 114. Databases 124, 128, 132 and 134 may be, include or interface to, for example, the Oracle™ relational database sold commercially by Oracle Corp. Other databases, such as Informix™, DB2 (Database 2) or other data storage or query formats or platforms such as OLAP (On Line Analytical Processing), SQL (Standard Query Language), Microsoft Access™ or others may also be used, incorporated or accessed in the invention.

Communication link 112 connects servers 114, 116, 118, 120, 122, 126 and 130 to each other and to clients 104, 108, and 110. Communications link 112 may be, include or interface to any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDI (Fiber Distributed Data Interface) or CDDI (Copper Distributed Data Interface) connections. Communications link 112 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 112 may yet further be, include or interface to any one or more of an RS-232 serial connection, an IEEE-1394 (Firewire) connection, a Fibre Channel connection, an IrDA (infrared) port, a SCSI (Small Computer Serial Interface) connection, a USB (Universal Serial Bus) connection or other wired or wireless, digital or analog interface or connection.

Servers 114, 116, 118, 120, 122, 126, 130 and clients 104, 108, and 110 may utilize networked enabled code related to communication link 112. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Java™, Jini™, C, C++, Perl, UNIX Shell, Visual Basic or Visual Basic Script, Virtual Reality Markup Language (VRML) or other compilers, assemblers, interpreters or other computer languages or platforms.

Figure 2:
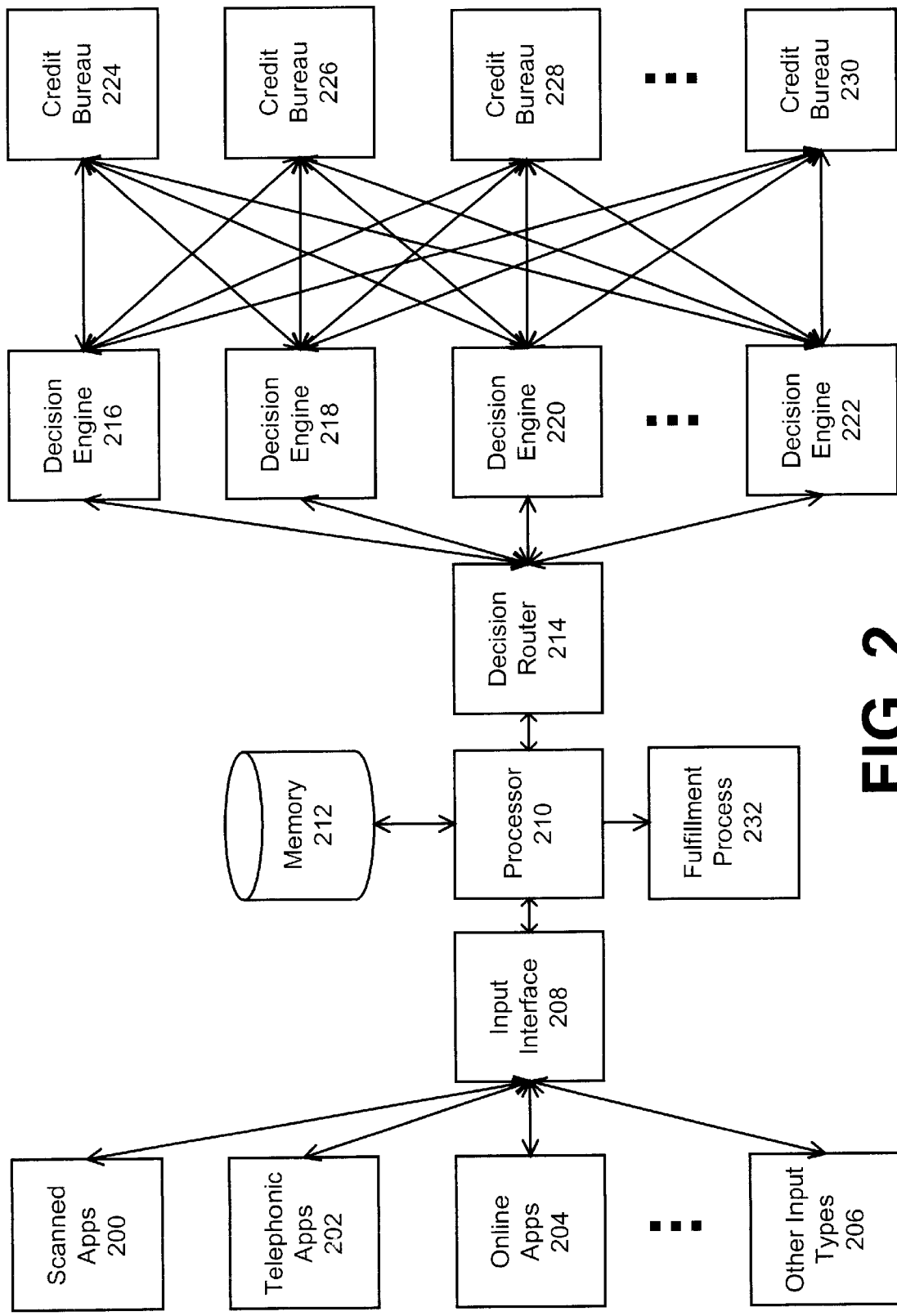
FIG. 2 is a flow diagram illustrating the logical relationship between functional components of a system that processes applications for financial services, according to one embodiment of the invention.

FIG. 2 is a flow diagram illustrating the logical relationship between functional components of a system that processes applications for financial services according to one embodiment of the invention. One purpose of the processes depicted in FIG. 2 is to make a decision, for each application, whether an offer should be made to an applicant for financial services such as a credit card account or a mortgage. The processes may also be used to establish terms of such an offer, for instance the maximum amount of money to be loaned, or the minimum interest rate to be charged.

Many of the functional elements in FIG. 2 can be related to components of the system architecture depicted in FIG. 1. For example, scanned applications 200 may reside on client 104; telephonic applications 202 may reside on client 108; and online applications 204 may be provided by client 110. Additionally, the functional elements in FIG. 2 identified as the input interface 208, processor 210, and decision router 214 may be executed on server 114. Memory 212 may correspond to database 134. Decision engines 216, 218, and 220 may be embodied in servers 116, 118, and 120. Credit bureaus 224, 226, and 228 may operate through servers 122, 126 and 130. Data source 206, decision engine 222, and credit bureau 230 are shown to indicate the expandability of the application processing method. The interface to fulfillment process 232 illustrates that a positive result from processing an application may be, for example, a downstream process that issues a credit card or provides some other consideration to the applicant. In another embodiment, fulfillment process 232 may interface more directly to decision engine 216, 218, 220, or 222.

Advantageously, input interface 208 is adapted to receive electronic application data from a variety of input sources and types, depicted in FIG. 2 as 200, 202, 204, and 206.

Processor 210 may perform or coordinate functions such as data collection, validation, tracking, repair, routing, fulfillment, and reporting. Data collection relates to application data received through interface 208. Validation may involve checking the application data received against a pre-defined set of criteria in order to identify data input or translation errors originating, for example, at sources 200, 202, 204, or 206. The repair function may be able to fix at least some of the errors types that are detected by the validation function. The routing function relates, for instance, to coordination of the decision router 214 described in more detail below. Processor 210 also may interface to or coordinate the passing of data to fulfillment process 232, for example in the case where a credit account is to be established or where a credit card is to be physically mailed to the customer of a bank or other financial institution.

Processor 210 may operate on the application data in either batch or real time mode. Batch mode may operate on a group of applications only at off-peak hours. Alternatively, batch mode may operate both during peak and off-peak hours to achieve workload leveling (in effect reducing or eliminating peak loads). Real time mode is required for interactive processing sessions, for example where an applicant is making application online and where a response is made to that applicant regarding an offer of financial services within seconds or minutes. Together, the flexible input interface 208 and selectable modes of processor 210 maximize the efficiency of server 114 and decision engines 216, 218, 220, and 222, and eliminate the need for dedicated application processing systems for different application data sources or types.

Decision router 214 performs at least three functions. First, it controls the routing of application data to decision engine(s) 216, 218, 220, and/or 222. Decision router 214 may select a single decision engine, for example where decision engines 216, 218, 220, and 222 are each tailored for different financial services and where the applicant has only applied for a single financial service. Decision router 214 may select two or more decision engines to process the application data simultaneously, for instance where the applicant has applied for more than one type of financial service. Such parallel processing may also be appropriate where the results of two or more decision engines are used to make a determination as to an offer for a single financial service. Decision router 214 may also select two or more decision engines to process the application data in serial fashion. This may be advantageous, for example, where the single financial service applied for was denied, but where the financial institution wishes to consider other financial services that it might offer to the applicant. Additionally, two or more decision engines may be selected for serial operation where the results of one decision engine can be used in subsequent calculations by another decision engine. Better decisions regarding offers for financial services may result from the ability to select and employ one or more decision engines during application processing.

A second function of decision router 214 is to provide formatting of the application data as required by each type of decision engine. In general, different developers may have coded decision engines 216, 218, 220, and 222, and they may have done so at different times. It is therefore unlikely that the required formats for the application data that they process are consistent. Decision router 214 may therefore utilize a library of decision engine proxies to format application data received from input sources 200, 202, 204, or 206 into the appropriate format for decision engines 216, 218, 220, and/or 222. The flexibility of this interface allows those who maintain the application processing system to readily connect to new or different decision engines. This may result in substantial time and cost savings.

A third function performed by decision router 214 is to receive the decisions reached by decision engines 216, 218, 220, and/or 222 and route them to other decision engines or to processor 210, as appropriate.

FIG. 2 also illustrates that decision engines 216, 218, 220, and 222 may each obtain historical credit information from one or more credit bureaus 224, 226, 228 and 230 that is considered together with application data from input sources 200, 202, 204, and 206 in making credit or other decisions. The decision engines, 216, 218, 220 and 222 may include, for example, the commercial MagnuM™, ACAPS™, First-Class™ or other engine or service.

Figure 3:
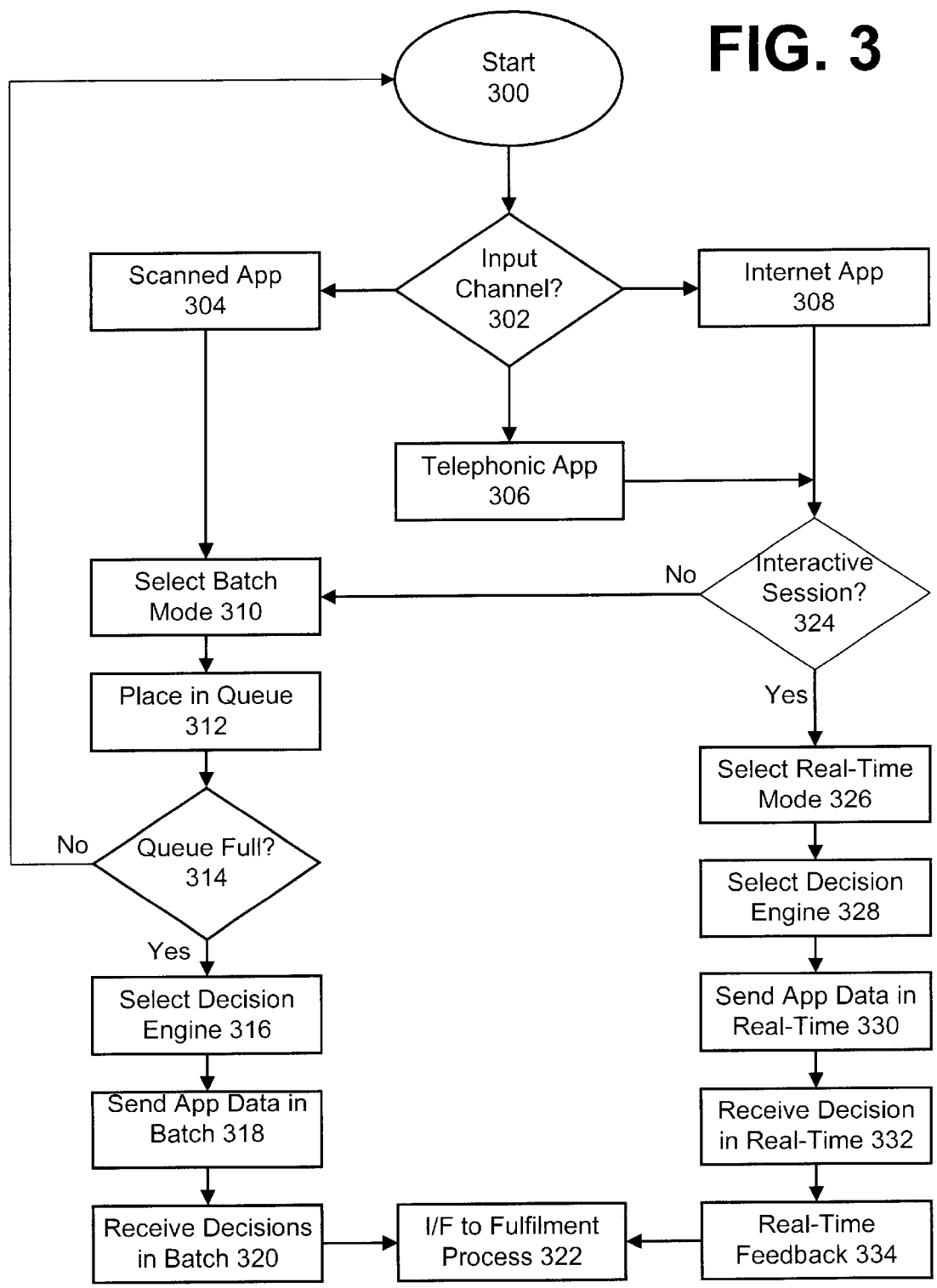
FIG. 3 is a flow diagram illustrating a method for processing applications related to financial services, according to one embodiment of the invention.

FIG. 3 is a flow diagram illustrating a method for processing applications related to financial services according to one embodiment of the invention. The diagram demonstrates that after an appropriate start 300, typically the receipt of application data, the processor must determine the input channel 302 from which the data came. If the data originated with a scanned paper application 304 or other non-interactive session 324, then batch mode is selected 310. Batch mode may function by placing data in a queue 312 until the queue becomes full 314 or until the processor determines that the decision engines have sufficient processing capacity (as with the load leveling technique described above). Thereafter, one or more decision engines are selected 316, and all applications in the batch are sent 318 to the decision engine(s). After decisions are received 320, positive results are sent to the fulfillment process 322.

FIG. 3 also illustrates that data from telephonic applications 306 or Internet applications 308 that are part of an interactive session 324 are selected 326 for real time processing. In real time mode, one or more decision engines must also be selected 328 before applicant data is sent 330 to the decision engines. In contrast to the batch mode, however, once results are returned 332, notification is made to the applicant in real time 334 before initiating the interface to the fulfillment process 322.

The dual mode capability illustrated by FIG. 3 provides an advantage for financial entities: separate systems for batch and real time processing of financial applications are not required. This may result in lower operating and support costs.

In an another embodiment of the process shown in FIG. 3, both alternatives operate in real time mode. In this instance, the only difference between alternative flows may be that one processing path provides for real-time feedback (process-and-notify) whereas the other does not (process).

Figure 4:
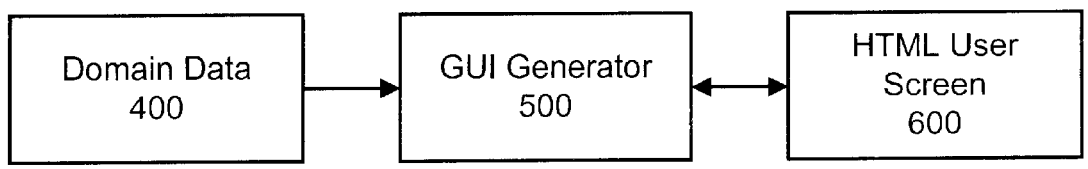
FIG. 4 is a flow diagram illustrating the inputs and outputs of an automated Graphical User Interface (GUI) generator, which has been adapted for mediating communication between an application processing system and an applicant.

FIG. 4 is a flow diagram illustrating the inputs and outputs of an automated Graphical User Interface (GUI) generator 500, which has been adapted for mediating communication between an application processing system and an applicant. The initial input is represented by domain data 400. Domain data 400 may include, for example, the name of an applicant and the location on the application that the name is to be found. Domain data 400 may similarly include the description and location of the applicant's address, present employer, or other information. Domain data 400 may be generated manually, for example by key entry, or it may be automated, as in the case of document scanning and character recognition. Generation of domain data 400 may further involve automatic conversion from a flat file format to XML format. The output of GUI generator 500 may be a User screen 600 that has been tailored for collecting and displaying information relevant to one or more financial services. There may be hundreds or even thousands of different embodiments of user screen 600. Automated generation of the user interface eliminates the time and expense that would otherwise be associated with manual code generation.

User screen 600 may further have a spatial correspondence to the variety of paper applications that it relates to. This may be an advantage, for example, where an agent of the financial entity processing the application is comparing the electronic version of application data to an original paper copy of the application. Where a user adds data to user screen 600, data from that screen may then become another input to GUI Generator.

Figure 5:
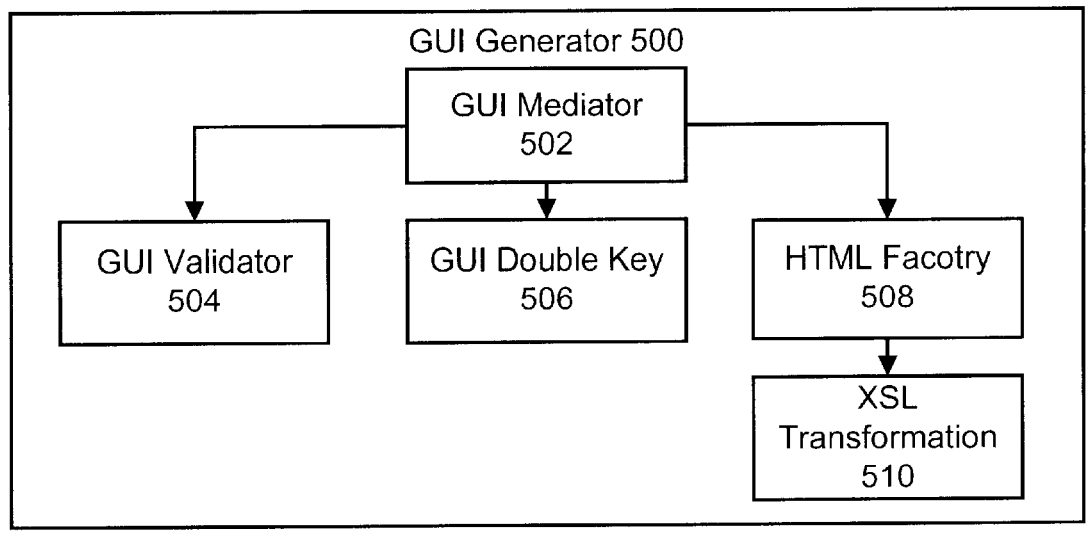
FIG. 5 is a flow diagram illustrating a method for mediating communication between a system and a user, according to one embodiment of the invention.

FIG. 5 is a flow diagram illustrating a method for mediating communication between a system and a user, according to one embodiment of the invention. All processes shown may be implemented via application software included in input interface 208, and may reside on server 114. In the instance where GUI generator 500 is to display a user screen 600 based on domain data 400, the GUI mediator 502 calls HTML factory 508 and utilizes XSL transformation 510 to convert XML formatted domain data 400 into an HTML user screen 600. In the instance where GUI generator 500 is to receive data that is input on user screen 600, GUI mediator 502 may validate the input data using GUI validator 504 and/or GUI double key checking 506.

GUI validator 504 may use a rules engine to perform a validation on the data entered by the user in step 600. Such rules may be encoded in a database using Java-like syntax, and may be loaded on instantiation of the service. GUI validator 504 may be implemented according to the JavaCC rules engine.

The GUI double key checking process 506 may be responsible for scanning the XML document to determine, for example, which fields need to be double keyed. In one embodiment, all double keyed fields may be cleared of text and returned to the user for re-keying. The original values may be stored in the document. If the re-key and the original input match, the document may be forwarded.

Figure 6:
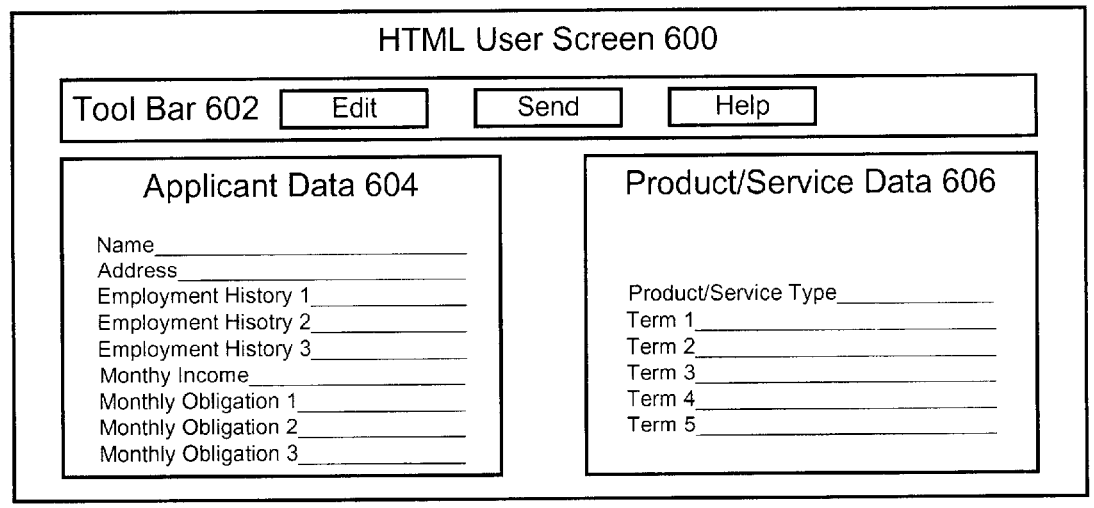
FIG. 6 is the schematic of a user screen resulting from operation of an automated Graphical User Interface (GUI) generator, according to one embodiment of the invention.

FIG. 6 is the schematic of a user screen resulting from operation of an automated Graphical User Interface (GUI) generator, according to one embodiment of the invention. The notional schematic illustrates that a user screen 600 may include a tool bar 602, drop down menu, or similar technique for selecting user functions. User screen 600 may also include data fields for collecting or correcting applicant data 604, or for defining, selecting, or viewing information about financial services that may be offered to the applicant 606.

The specification and examples provided above should be considered exemplary only. It is contemplated that the appended claims will cover any other such embodiments or modifications as fall within the true scope of the invention.

What is claimed is:

1. A method for automatically generating a graphical user interface for use in receiving an application for a financial services product, comprising:
   (a) receiving domain data defining layout attributes of an application for a particular financial services product out of multiple financial services products for which applications can be made, the layout attributes including field descriptions and locations on the application for the fields;
   (b) based on the layout attributes, converting the domain data to a presentable format comprising a graphical user interface applicant screen by automatically generating user interface script; and
   (c) displaying the applicant screen according to the domain data received in step (a) and the resulting format from the conversion in step (b), the applicant screen being customized for the particular financial services product;
   (d) wherein the applicant screen substantially reflects the layout of a printed application for the particular financial services product.

2. The method of claim 1, wherein the step (a) of receiving comprises inputting data manually.

3. The method of claim 1, wherein the step (a) of receiving comprises collecting data from a scanner in a semi-automated process.

4. The method of claim 1, wherein the step (a) of receiving comprises interfacing to a pre-existing database of domain data.

5. The method of claim 1, wherein the step (a) of receiving comprises automated conversion from a flat file to data in Extensible Markup Language (XML) format.

6. The method of claim 1, wherein the step (b) of converting comprises a step (e) of translating from Extensible Markup Language (XML) to Hyper Text Markup Language (HTML) format.

7. The method of claim 6, wherein the step (e) of converting is accomplished with application of Extensible Stylesheet Language (XSL).

8. The method of claim 1, wherein the step (b) of converting is accomplished with application of Extensible Stylesheet Language (XSL) without resulting in Hyper Text Markup Language (HTML) format.

9. The method of claim 1, wherein the step (b) of converting comprises application of Document Style Semantics and Specification Language (DSSSL).

10. The method of claim 1, wherein the step (b) of converting comprises application of Cascading Style Sheets (CSS).

11. The method of claim 1, wherein the step (b) of converting is executed on an as-needed basis in response to an applicant action initiating an application for the particular financial services product, thereby providing for the generation of the graphical user interface applicant screen on a per-transaction basis.

12. The method of claim 1, wherein the step (b) of converting is executed when triggered by a change in domain data, thereby providing for the generation of the graphical user interface applicant screen each time the domain data for the particular financial services product is modified.

13. The method of claim 1, wherein the step (b) of converting is executed at scheduled intervals.

14. The method of claim 1, further comprising the step of (e) receiving applicant input information entered into the graphical user interface for the particular financial services product.

15. The method of claim 14, wherein the applicant input information is processed for making an approval determination using a selected one or a selected more than one, of a plurality of selectable decision engines.

16. The method of claim 14, wherein the applicant input information is forwarded to a rules engine for validating the data input by the applicant.

17. A system for automatically generating customized graphical user interfaces for applications for financial services products, comprising:
   a database of domain data defining layout attributes of customized applications for a plurality of financial services products, the layout attributes including field descriptions and locations on the application for the fields;
   a processing server for processing applicant requests for financial services products from the plurality of financial services products, the processing server receiving the applicant requests and providing decisions;
   a graphical user interface generator for converting, based on the layout attributes, domain data for a particular financial services product into a graphical user interface applicant screen tailored for the particular financial services product, wherein the conversion comprises automatically generating user interface script based on domain data for the particular financial services product.

18. The system of claim 17, wherein the graphical user interface generator produces the tailored graphical user interface screen in response to an applicant requesting the particular financial services product, thereby generating the tailored graphical user interface on a per-transaction basis.

19. The system of claim 17, wherein the graphical user interface generator produces the tailored graphical user interface screen in response to a change made to the database of domain data, thereby generating the tailored graphical user interface each time the database is modified.

20. The system of claim 17, wherein the domain data comprises entries made to flat file data that are automatically converted to Extensible Markup Language (XML) format each time the graphical user interface generator is generating a graphical user interface.

21. The system of claim 17, wherein the graphical user interface generator converts domain data in Extensible Markup Language (XML) format to Hypertext Markup Language (HTML) format.

22. The system of claim 21, wherein the conversion from XML to HTML is carried out using Extensible Stylesheet Language (XSL).

23. The system of claim 17, wherein the processing server receives an applicant request comprising applicant input information entered into the graphical user interface for the particular financial services product.

24. The system of claim 23, wherein the processing server processes the applicant input information for making an approval determination using a selected one or a selected more than one, of a plurality of selectable decision engines.

25. The method of claim 23, wherein the applicant input information is forwarded to a rules engine for validating the data input by the applicant.

* * * * *